United States Patent [19]
Dorenbosch et al.

[11] Patent Number: 5,778,323
[45] Date of Patent: Jul. 7, 1998

[54] METHOD AND APPARATUS FOR FACILITATING A RECOVERY FROM A CONFIGURATION ERROR IN A COMMUNICATION SYSTEM

[75] Inventors: Jheroen P. Dorenbosch, Paradise; Xuming Chen, North Richland Hills; R. Louis Breeden, Colleyville, all of Tex.

[73] Assignee: Motorola, Inc., Schaumburg, Ill.

[21] Appl. No.: 726,891

[22] Filed: Oct. 4, 1996

[51] Int. Cl.$^6$ .................................................. H04B 1/06
[52] U.S. Cl. .................... 455/561; 455/38.1; 455/68; 455/507; 707/202
[58] Field of Search .................... 364/282.1, 282.2, 364/282.4; 395/601, 610, 617, 619; 707/10, 201, 511, 202; 455/560, 561, 38.1, 68, 507; 340/825.44

[56] References Cited

U.S. PATENT DOCUMENTS

| | | | |
|---|---|---|---|
| 4,277,845 | 7/1981 | Smith et al. | 455/38.1 |
| 4,635,189 | 1/1987 | Kendall | 707/10 |
| 5,019,963 | 5/1991 | Alderson et al. | 707/201 |
| 5,113,519 | 5/1992 | Johnson et al. | 707/201 |
| 5,463,671 | 10/1995 | Marsh et al. | 455/445 |
| 5,473,772 | 12/1995 | Halliwell et al. | 395/712 |
| 5,511,188 | 4/1996 | Pascucci et al. | 707/203 |
| 5,594,796 | 1/1997 | Grube et al. | 380/25 |
| 5,600,834 | 2/1997 | Howard | 707/201 |
| 5,689,706 | 11/1997 | Rao et al. | 395/617 |

OTHER PUBLICATIONS

Motorola, "AMSD Wireless Messaging System Infrastructure", all pages, 1996, U.S.A.

*Primary Examiner*—Edward F. Urban
*Assistant Examiner*—Makoto Aoki
*Attorney, Agent, or Firm*—R. Louis Breeden

[57] ABSTRACT

A message sender (120, 700) and an output controller (110, 600) having an output configuration recover from a configuration error in a communication system. The output controller defines (404) a current output configuration tag (220) for identifying a current output configuration (212) in response to the output configuration being changed to the current output configuration. The message sender sends (506) to the output controller a recorded configuration tag corresponding to the output controller, in response to having a message to send to the output controller. The output controller and the message sender cooperate (512) to recover from the configuration error produced when the recorded configuration tag is different from the current configuration tag.

3 Claims, 5 Drawing Sheets

METHOD AND APPARATUS FOR FACILITATING A RECOVERY FROM A CONFIGURATION ERROR IN A COMMUNICATION SYSTEM

FIELD OF THE INVENTION

This invention relates in general to communication systems, and more specifically to a method and apparatus for facilitating a recovery from a configuration error in a communication system.

BACKGROUND OF THE INVENTION

A wide area radio messaging system can have numerous message senders, which provide access to the messaging system by message originators for inputting messages; and numerous output controllers, which provide queuing and output of the messages to intended subscriber units via radio transmitters. In one embodiment of such a system, each of the output controllers is expected to notify all potential message senders whenever there is a significant change in the output configuration of the output controller. The output configuration includes parameters such as the number of radio channels available to the output controller, the frequencies of the channels, the messaging protocols supported, and system identifiers transmitted on each channel. In general, not every output controller in a given area has an output configuration that is compatible with every subscriber unit in the system. Thus, it is important for the message senders to maintain accurate databases of the current output configurations of the output controllers, so that each message sender can ascertain that each message is forwarded to an output controller that is compatible with the subscriber unit for which the message is intended.

Output configuration change notifications are usually broadcast from the output controllers to the message senders throughout a network that interconnects the message senders and the output controllers. Currently, however, a change notification can be missed by one or more message senders due to network errors or because a message sender is out of service at the time the change notification is sent. A lost change notification causes the affected message sender's database of output configurations to contain inaccuracies, which can result in a message being sent to an output controller that is incompatible with the intended subscriber unit. Thus, a lost change notification can cause lost messages, thereby degrading the reliability of the messaging system.

What is needed, therefore, is a method and apparatus that can facilitate a recovery from a configuration error in a message sender's database. Preferably, the method and apparatus will detect and correct the configuration error before any messages are lost, and will operate in a manner that does not require a large amount of communication overhead.

SUMMARY OF THE INVENTION

An aspect of the present invention is a method for facilitating a recovery from a configuration error in a communication system including a message sender and an output controller having an output configuration. The method comprises the step of defining, in the output controller, a current configuration tag for identifying a current output configuration in response to the output configuration being changed to the current output configuration. The method further comprises the steps of sending, from the message sender to the output controller, a recorded configuration tag corresponding to the output controller, in response to having a message to send to the output controller; and recovering, by the output controller and the message sender, from the configuration error produced when the recorded configuration tag is different from the current configuration tag.

Another aspect of the present invention is a method for facilitating a recovery from a configuration error in a communication system comprising a message sender and an output controller having an output configuration. The method comprises the steps of transmitting, from the output controller, a notification comprising a current output configuration in response to the output configuration of the output controller being changed to the current output configuration, the notification intended for reception by the message sender; and storing a time stamp in a memory element of the output controller indicating a time the notification was transmitted.

A third aspect of the present invention is an output controller in a communication system having a message sender, the output controller for facilitating a recovery from a configuration error. The output controller comprises a communication interface coupled to the message sender for communicating with the message sender, and a processing system coupled to the communication interface for processing communications transmitted and received through the communication interface. The output controller further comprises an output interface coupled to the processing system for cooperating therewith to maintain an output configuration of the output controller. The processing system is programmed to define a current configuration tag for identifying a current output configuration in response to the output configuration being changed to the current output configuration, and to receive with a message, from the message sender, a recorded configuration tag corresponding to the output controller. The processing system is further programmed to recover from the configuration error produced when the recorded configuration tag is different from the current configuration tag.

A fourth aspect of the present invention is a message sender in a communication system comprising an output controller having an output configuration, the message sender for facilitating a recovery from a configuration error. The message sender comprises a network interface-for receiving a message from a message originator, and a processing system coupled to the network interface for processing the message. The message sender further comprises a communication interface coupled to the processing system for communicating with the output controller. The processing system is programmed to send with the message to the output controller a recorded configuration tag corresponding to the output controller.

A fifth aspect of the present invention is an output controller in a communication system having a message sender, the output controller for facilitating a recovery from a configuration error. The output controller comprises a communication interface coupled to the message sender for communicating with the message sender, and a processing system coupled to the communication interface for processing communications transmitted and received through the communication interface. The output controller further comprises an output interface coupled to the processing system for cooperating therewith to maintain an output configuration of the output controller. The processing system is programmed to transmit a notification comprising a current output configuration in response to the output configuration being changed to the current output configuration, the notification intended for reception by the message sender, and to store a time stamp in a memory element of the output controller indicating a time the notification was transmitted.

A sixth aspect of the present invention is a message sender in a communication system having an output controller, the message sender for facilitating a recovery from a configuration error. The message sender comprises a network interface for receiving a message from a message originator, and a processing system coupled to the network interface for processing the message. The message sender further comprises a communication interface coupled to the processing system for communicating with the output controller. The processing system is programmed to send to the output controller a request for retransmission of a current output configuration of the output controller, the request qualified by a time value, in response to a reestablishment of communications between the message sender and the output controller following a loss thereof.

DETAILED DESCRIPTION OF THE DRAWINGS

Figure 1:
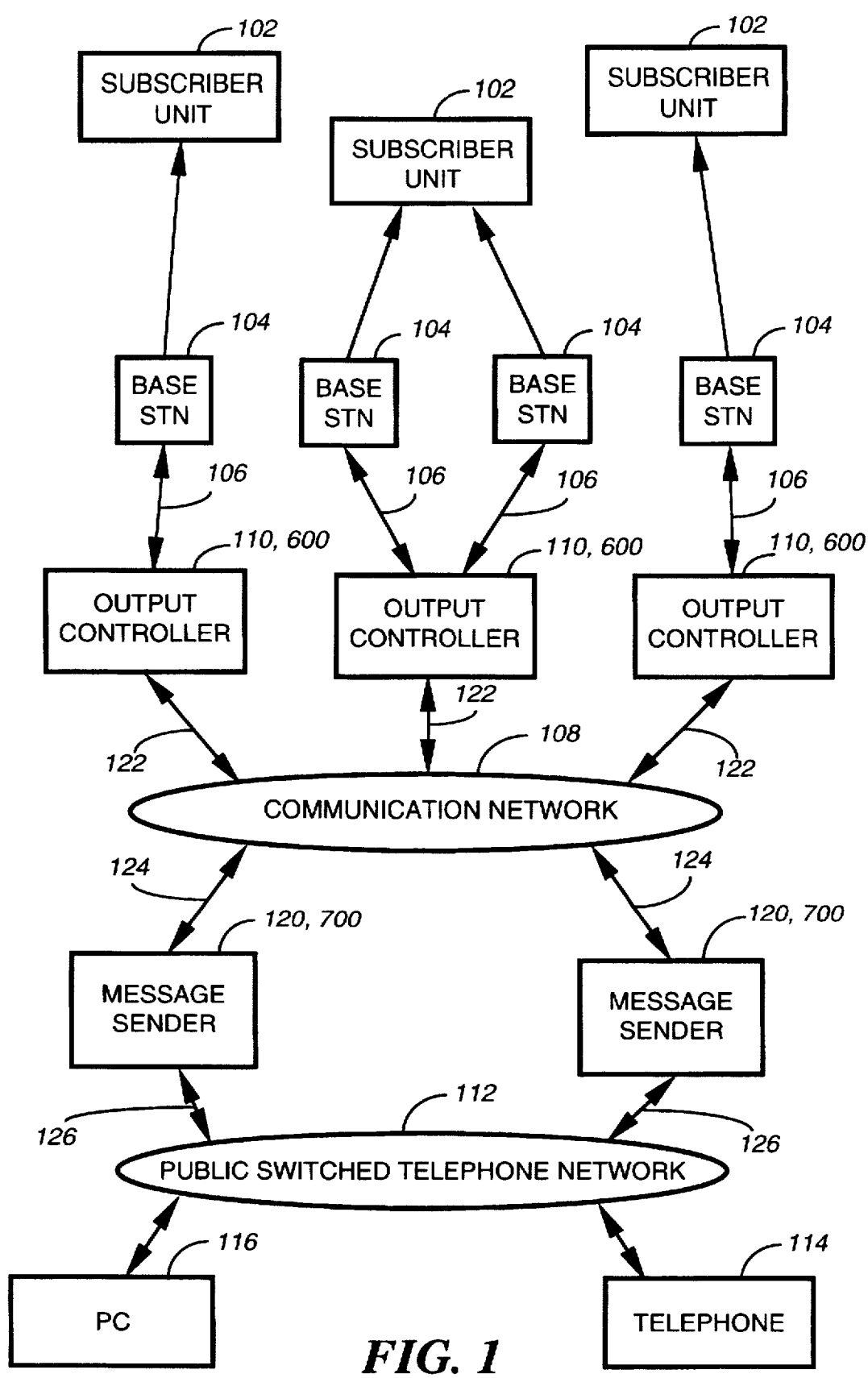
FIG. 1 is an electrical block diagram of a radio communication system in accordance with the present invention.

Referring to FIG. 1, an electrical block diagram of a radio communication system in accordance with the present invention comprises a plurality of subscriber units 102, which communicate by radio with a plurality of base stations 104 for receiving selective call messages. The base stations 104 are coupled via communication links 106 to a plurality of output controllers 110, 600 for control thereby utilizing well-known techniques for base station control. The output controllers 110, 600 are coupled to a plurality of message senders 120, 700 via communication links 122, 124, and via a conventional communication network 108 for receiving the selective call messages from the message senders 120, 700. The message senders 120, 700 and the output controllers 110, 600 preferably communicate by utilizing a well-known protocol, e.g., the Wireless Messaging Telocator Protocol (WMtp™) or the InterPaging Networking Protocol (IPNP). The message senders 120, 700 are preferably coupled via telephone links 126 to a public switched telephone network 112 (PSTN) for receiving the messages from message originators utilizing, for example, a telephone 114 or a personal computer 116 to originate the messages. It will be appreciated that, alternatively, other types of communication networks, e.g., packet switched networks and local area networks, can be utilized as well for transporting originated messages to the message senders 120, 700. The hardware of the message senders 120, 700 is preferably similar to the Wireless Messaging Gateway (WMG™) Administrator paging terminal, while the hardware of the output controllers 110, 600 is preferably similar to that of the RF-Conductor™ message distributor, both manufactured by Motorola, Inc. of Schaumburg, Ill. The base stations 104 are preferably similar to the Nucleus® Orchestra! transmitter manufactured by Motorola, Inc. It will be appreciated that other similar hardware can be utilized as well for the message sender 120, 700, the output controller 110, 600, and the base stations 104. By way of example, the radio communication system depicted in FIG. 1 is a one-way messaging system. It will be appreciated that the present invention can be applied to a two-way messaging system as well.

The protocol utilized for transmitting the messages between the base stations 104 and the subscriber units 102 is preferably similar to Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other messaging protocols can be used as well.

Figure 2:
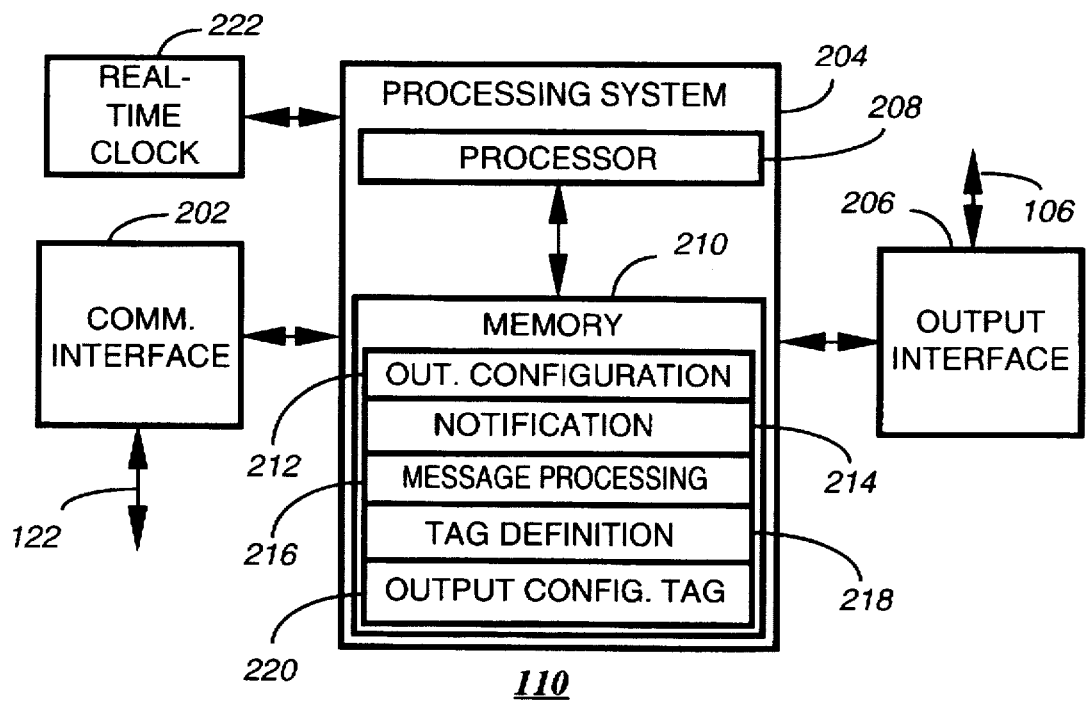
FIG. 2 is an electrical block diagram of an output controller in accordance with a first embodiment of the present invention.

Referring to FIG. 2, an electrical block diagram of the output controller 110 in accordance with a first embodiment of the present invention comprises a conventional communication interface 202 for communicating with the message senders 120 via the communication link 122. The output controller 110 also includes a processing system 204 coupled to the communication interface 202 for processing communications transmitted and received through the communication interface 202. A conventional output interface 206 is also coupled to the processing system for cooperating with the processing system to maintain an output configuration of the output controller 110. A conventional real-time clock 222 is coupled to the processing system 204 for providing thereto a time signal. The processing system 204 comprises a processor 208 for executing the operations of the processing system 204, and a memory 210 for storing executable software elements for programming the processor 208. The memory 210 comprises a location for storing the current output configuration 212 of the output controller 110. The memory 210 also includes a notification element 214 for programming the processing system 204 to transmit a notification comprising a current configuration tag and a current output configuration whenever the output configuration has been changed. The memory 210 also includes a message processing element 216 for programming the processing system 204 to process messages received and transmitted via the communication interface 202 and the output interface 206. The memory 210 further comprises a tag definition element 218 for programming the processing system 204 to define a current configuration tag for identifying the current output configuration whenever a change has been made to the output configuration. In addition, the memory 210 includes a location for storing the current output configuration tag 220 for comparison with a recorded configuration tag that accompanies a message from the message sender 120.

Figure 3:
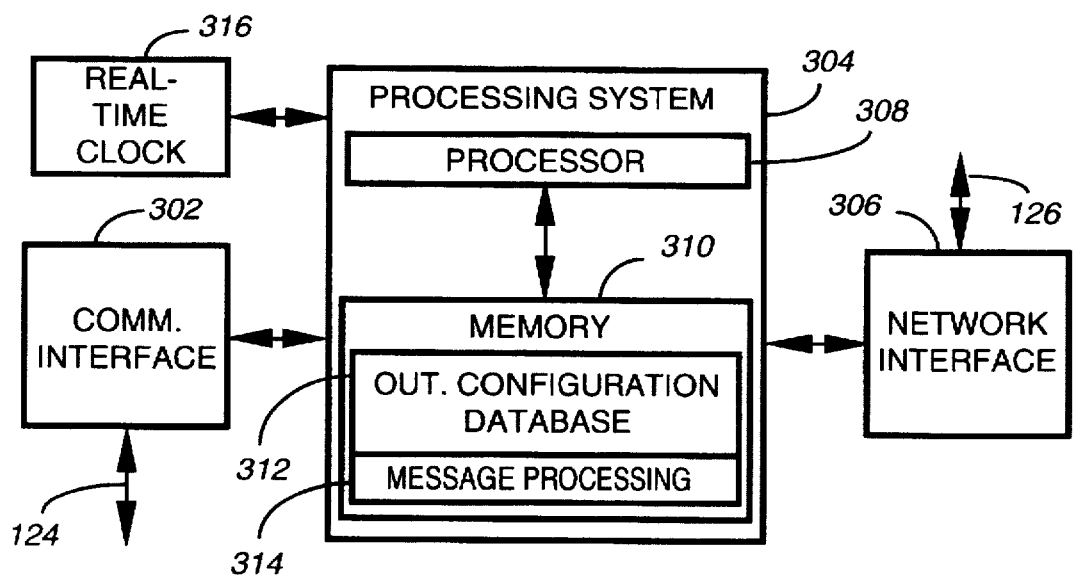
FIG. 3 is an electrical block diagram of a message sender in accordance with the first embodiment of the present invention.

Referring to FIG. 3, an electrical block diagram of the message sender 120 in accordance with the first embodiment of the present invention includes a conventional communication interface 302 for communicating with the output controllers 110 via the communication link 124. The communication interface 302 is coupled to a processing system 304 for processing the communications. A conventional network interface 306 is coupled to the processing system 304 for receiving message originations via the telephone link 126. A conventional real-time clock 316 is coupled to the processing system 304 for providing thereto a time signal. The processing system 304 comprises a processor 308 for executing the operations of the message sender, and a memory 310 for storing executable software for programming the processing system 304. The memory 310 includes an output configuration database 312 for storing a recorded configuration tag and information describing the output configuration corresponding to each of the output controllers 110. The memory 310 also includes a message processing element 314 for programming the processing system 304 to process messages received and transmitted via the communication interface 302 and the network interface 306.

Figure 4:
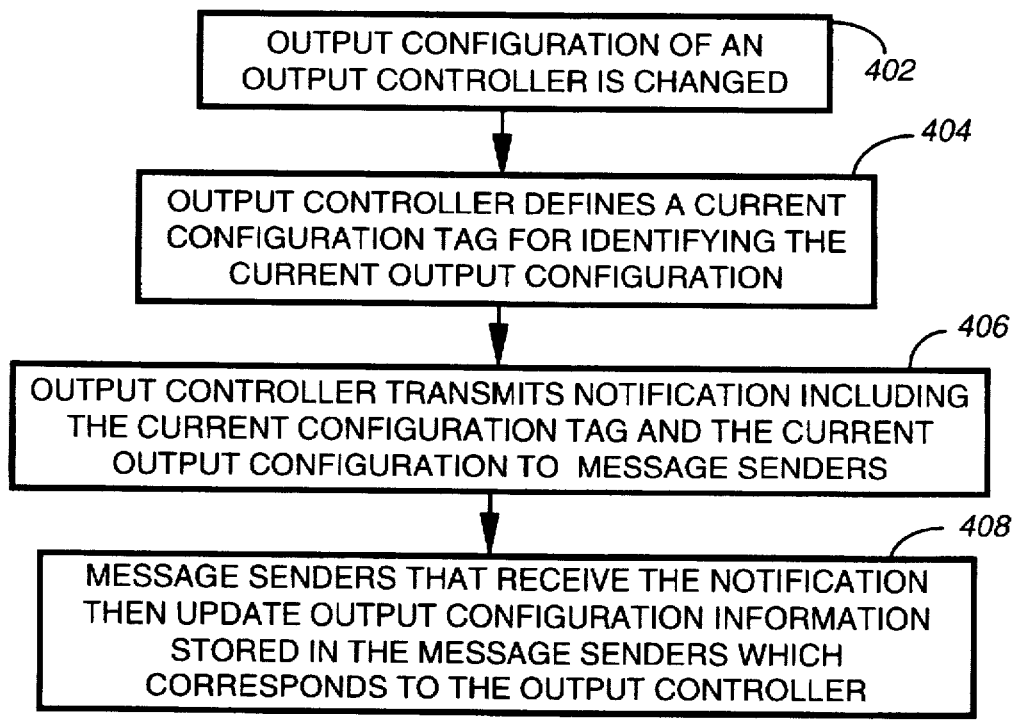
FIG. 4 is a flow chart depicting output configuration updating in the radio communication system in accordance with the first embodiment of the present invention.

Referring to FIG. 4, a flow chart 400 depicts output configuration updating in the radio communication system in accordance with the first embodiment of the present invention. The flow chart 400 begins with the output configuration of one of the output controllers being changed 402. In response to the change, the processing system 204 accesses the tag definition element 218 to define 404 a current configuration tag for identifying the current output configuration. Preferably, the tag is a short (one or two byte) integer number, which is incremented by one whenever the output configuration is changed. It will be appreciated that, alternatively, the tag can be a text string, a date, a time, or various combinations thereof. In response to defining the current configuration tag, the processing system 204 transmits 406, via the communication interface 202, a notification including the current configuration tag and the current output configuration, along with the identity of the sending output controller 110. The notification is intended for receipt by all the message senders 120. The message senders 120 that receive the notification then update 408 the entry in their output configuration database 312 that corresponds to the identified output controller 110.

Figure 5:
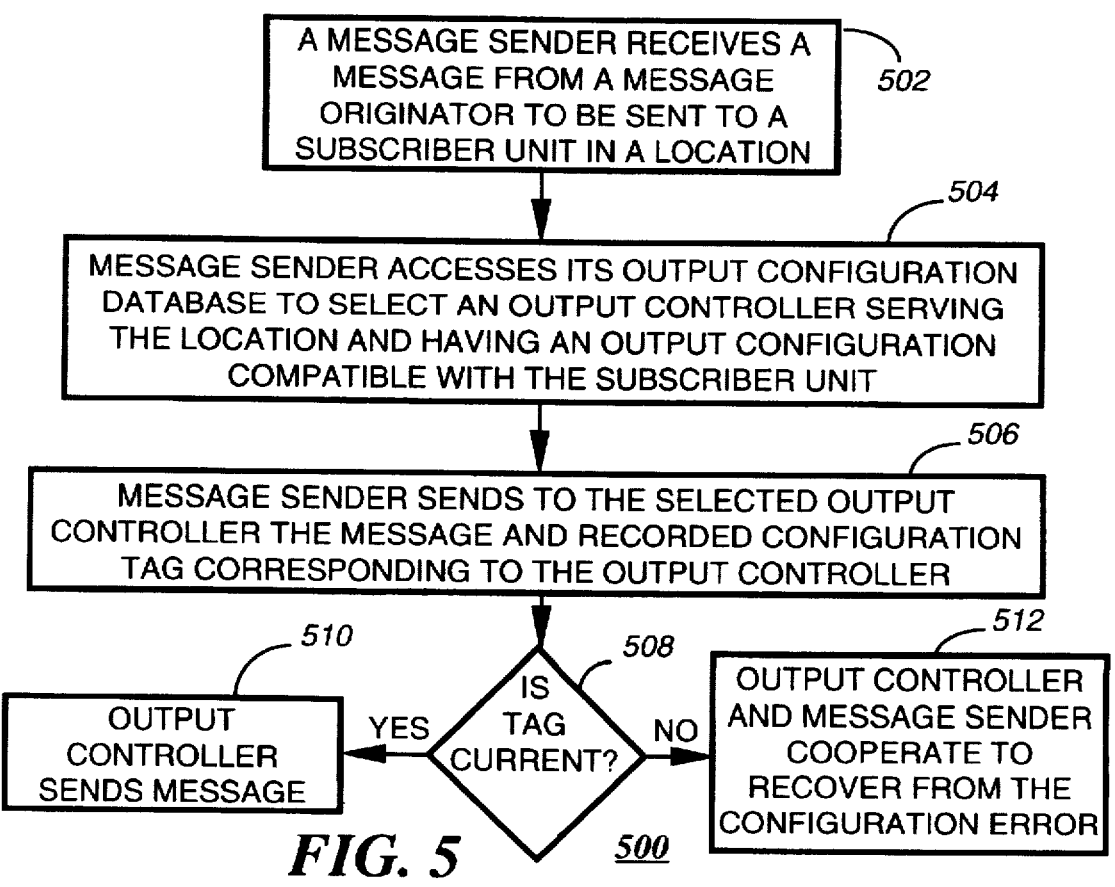
FIG. 5 is a flow chart depicting output configuration verification in the radio communication system in accordance with the first embodiment of the present invention.

Referring to FIG. 5, a flow chart 500 depicts output configuration verification in the radio communication system in accordance with the first embodiment of the present invention. The flow chart 500 begins with a message sender 120 receiving 502 a message from a message originator to be sent to a subscriber unit 102. The processing system 304 then accesses a subscriber database (not shown) in the memory 310 using well-known techniques to determine the location of the subscriber unit 102 as well as pertinent output configuration information, e.g., protocol type and operating frequencies, required for compatibility with the subscriber unit 102. The processing system 304 then accesses 504 its output configuration database 312 to select an output controller 110 that serves the location of the subscriber unit 102 and that has an output configuration that is compatible with the subscriber unit 102. The message sender 120 then sends 506 to the selected output controller 110 the message and a recorded configuration tag corresponding to the selected output controller 110, the tag having been retrieved from the output configuration database 312. When the output controller 110 receives the message and the recorded configuration tag, the output controller 110 compares the recorded configuration tag with the current output configuration tag 220 stored in the output controller 110. In step 508, if the recorded tag matches the current output configuration tag 220, then the output controller 110 controls the base stations 104 to send 510 the message. If, on the other hand, the recorded tag does not match the current tag, then the output controller 110 and the message sender 120 cooperate 512 to recover from the resultant configuration error.

In cooperating to recover from the configuration error, the output controller 110 preferably returns a configuration error indication to the message sender 120, along with an update package comprising the current configuration tag, the current output configuration, and the identity of the output controller 110. The message sender 120 then updates its output configuration information stored in the output configuration database 312 with the update package. The message sender 120 then reselects an output controller 110 that serves the location of the subscriber unit 102 and that has an output configuration compatible with the subscriber unit 102. The message sender 120 then resends the message and the recorded configuration tag corresponding to the selected output controller 110 in accordance with the updated output configuration information. Thus, the first embodiment of the present invention advantageously prevents messages from being lost because of outdated output configuration information in the message sender 120. Whenever a message arrives with an outdated recorded configuration tag, the configuration error is immediately corrected and the message is resent in accordance with the correct output configuration information.

Alternatively, in cooperating to recover from the configuration error, the output controller 110 can merely return a configuration error indication to the message sender 120, and then wait for the message sender 120 to send a configuration query to the output controller 110. The output controller 110 can then transmit information comprising the current configuration tag and the current output configuration, in response to the configuration query. It will be appreciated that the message sender 120 also can send the configuration query whenever the message sender 120 determines a need for configuration information from the output controller 110 for any reason.

As a further alternative, it will be appreciated that in some systems steps 406 and 408 of the flow chart 400 can be omitted. In such systems when an output configuration is changed and a new current configuration tag defined, the change will not be known to a message sender 120 until an attempt is made to send a message with the erroneous recorded configuration tag to an output controller. When the configuration error is detected, the output controller 110 and the message sender 120 can then cooperate to recover from the configuration error in one of the manners described above.

Figure 6:
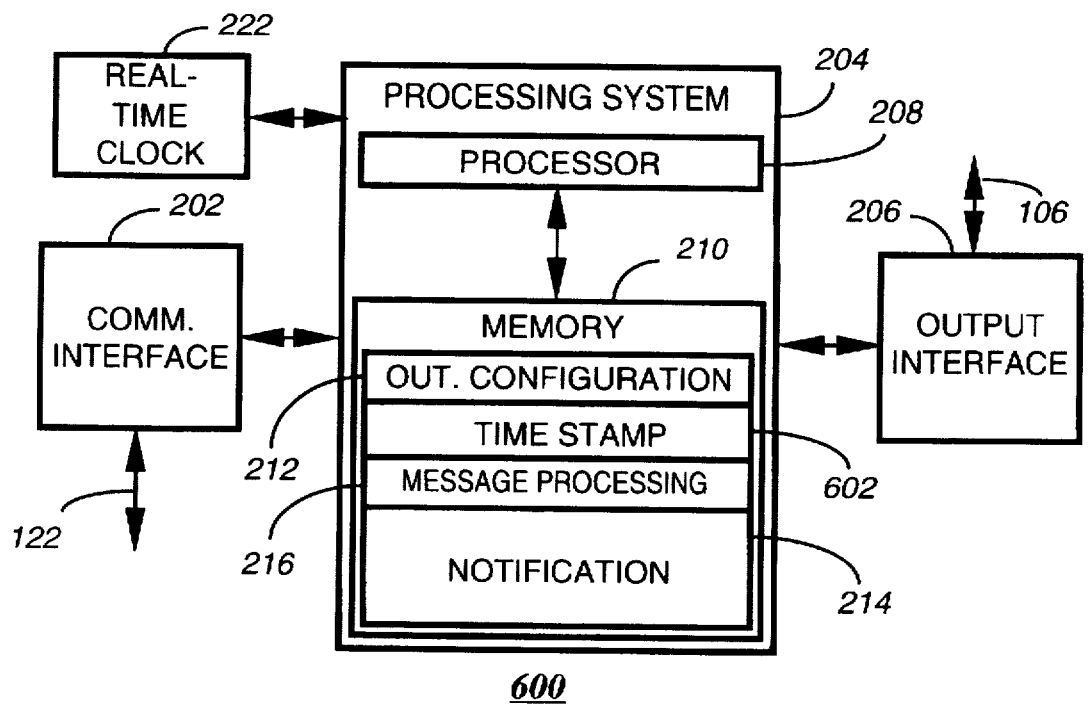
FIG. 6 is an electrical block diagram of an output controller in accordance with a second embodiment of the present invention.

Referring to FIG. 6, an electrical block diagram of the output controller 600 in accordance with a second embodiment of the present invention is similar to that of the output controller 110, the essential differences being that the tag definition element 218 and the current output configuration tag 220 have been replaced with a time stamp 602. The time stamp 602 is for recording the time at which the current output configuration of the output controller 600 was last broadcast to the message senders 700.

Figure 7:
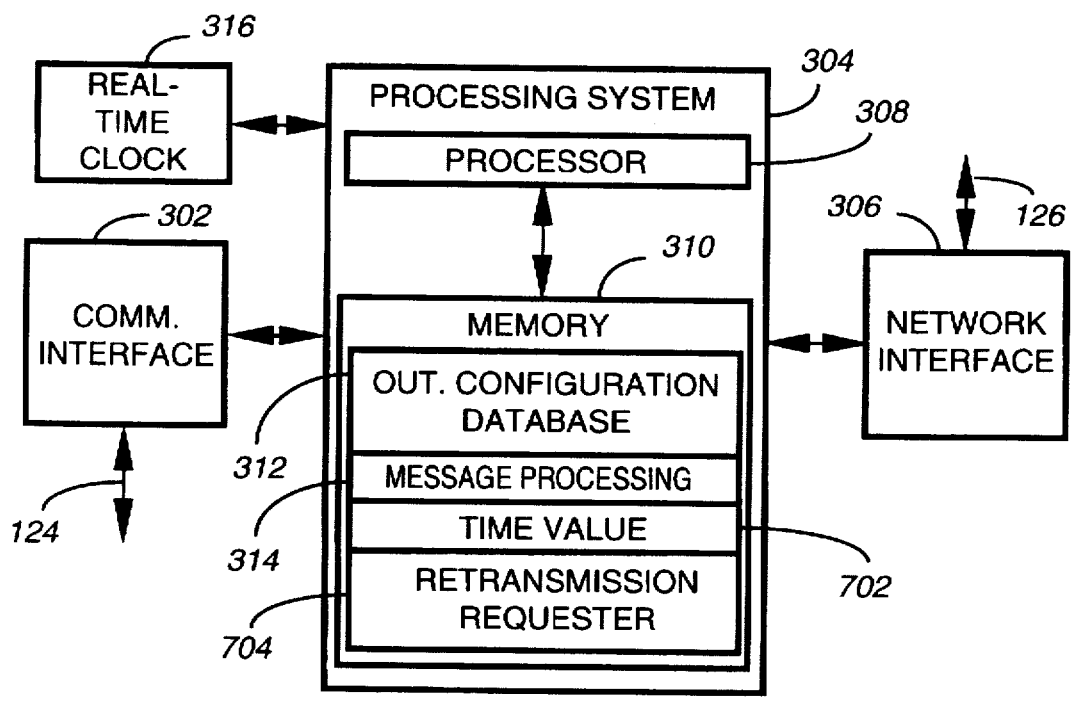
FIG. 7 is an electrical block diagram of a message sender in accordance with the second embodiment of the present invention.

Referring to FIG. 7, an electrical block diagram of the message sender 700 in accordance with the second embodiment of the present invention is similar to that of the message sender 120, the essential differences being the addition of a time value 702 and a retransmission requester 704 in the memory 310. The time value 702 records the time at which communications are lost between the message sender 700 and the output controllers 600 when, for example, the message sender 700 is shut down for maintenance. The time value 702 preferably includes date information as well, so that periods longer than twenty-four hours can be tracked. The retransmission requester 704 is for sending a request to the output controllers 600 for retransmission of the current output configuration, in response to communications being reestablished between the message sender 700 and the output controllers 600 following a loss thereof. The request is qualified by the time value 702 to prevent unnecessary responses from the output controllers 600 that have not had a change made to their output configuration later than the time value 702. The output controllers 600 determine whether to respond by comparing the time stamp 602 with the time value 702 received from the message sender 700.

Figure 8:
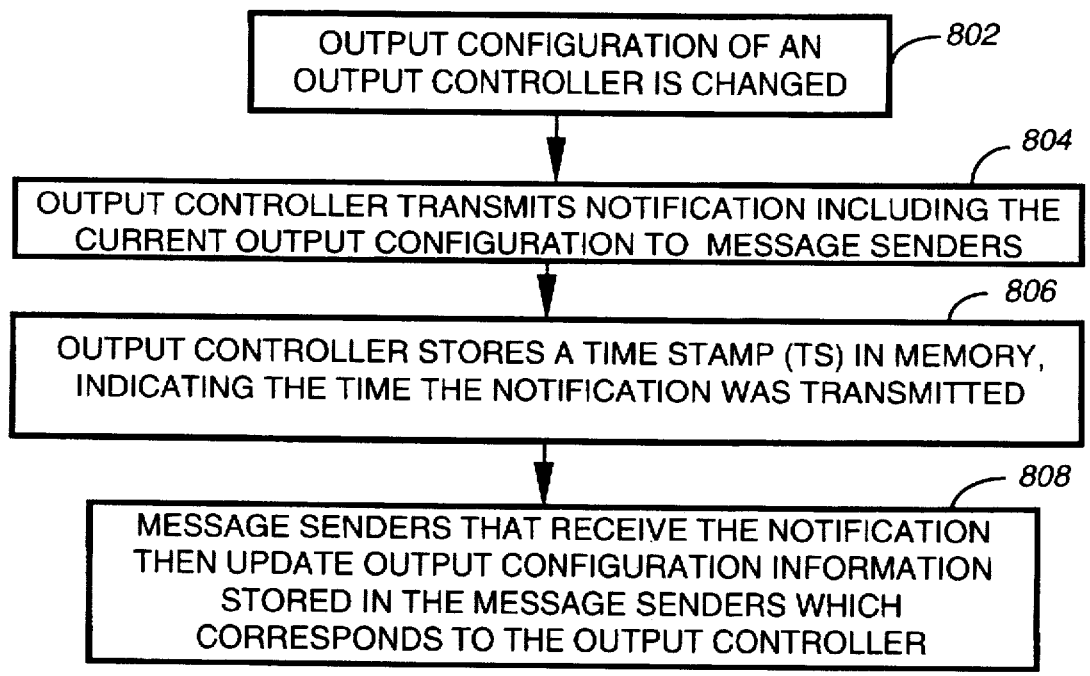
FIG. 8 is a flow chart depicting output configuration updating in the radio communication system in accordance with the second embodiment of the present invention.

Referring to FIG. 8, a flow chart 800 depicting output configuration updating in the radio communication system in accordance with the second embodiment of the present invention begins with the output configuration of an output controller 600 being changed 802. In response, the output controller 600 transmits 804 a notification including the current output configuration of the output controller 600. The notification is intended to be received by all the message senders 700. The output controller 600 also stores 806 the time stamp 602 in the memory 210 to indicate the time at which the notification was sent. The message senders 700 that receive the notification then update the output configuration information stored in their output configuration databases 312 in accordance with the notification.

Figure 9:
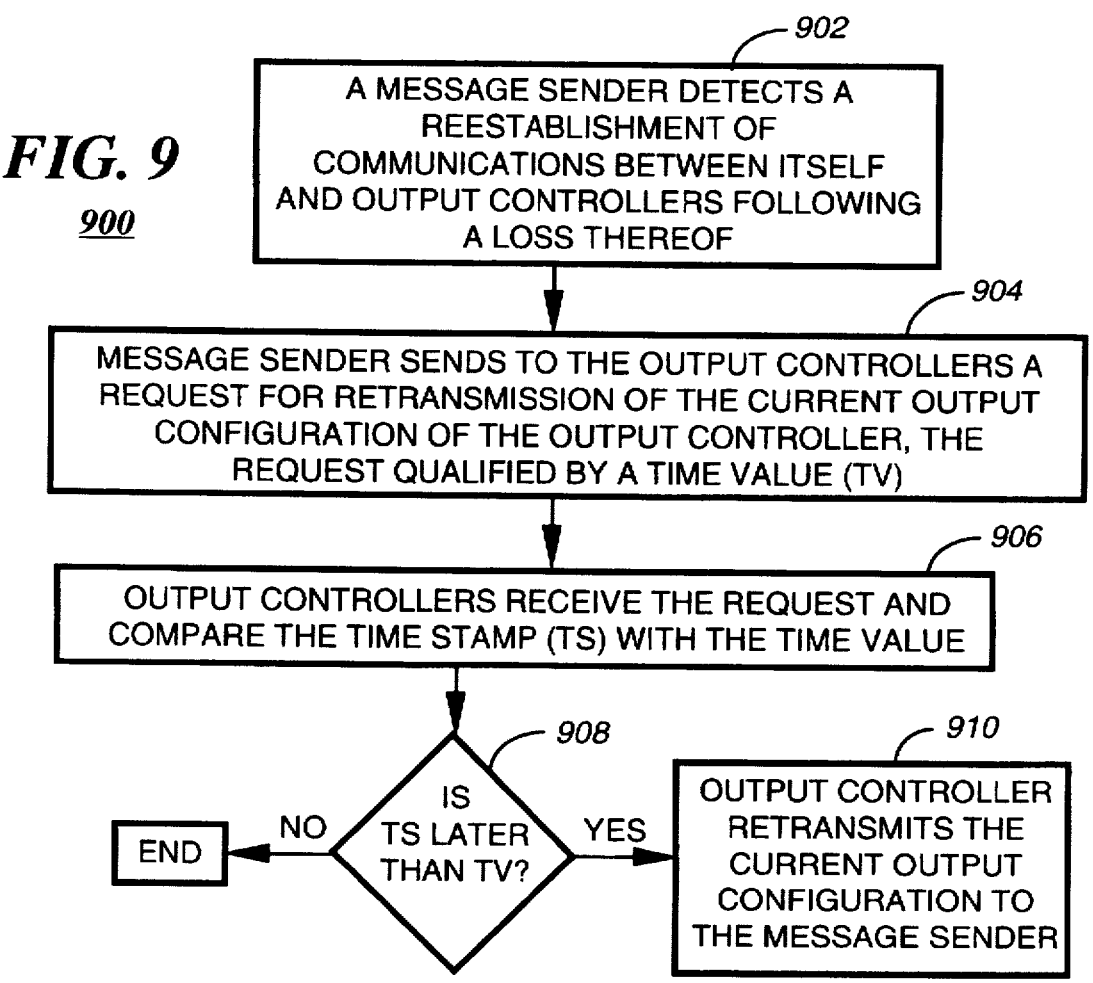
FIG. 9 is a flow chart depicting output configuration retransmission in the radio communication system in accordance with the second embodiment of the present invention.

Referring to FIG. 9, a flow chart 900 depicting output configuration retransmission in the radio communication system in accordance with the second embodiment of the present invention begins with a message sender 700 detecting 902 a reestablishment of communications between itself and the output controllers 600 following a loss thereof. In response, the message sender 700 sends to the output controllers 600 a request for retransmission of the current output configuration of the output controller 600, the request qualified by the time value 702. The output controllers 600 receive 904 the request, and each compares its time stamp 602 with the time value 702 received from the message sender 700. In step 908 each output controller 600 determines whether its time stamp 602 is later than the time value 702 received from the message sender 700. If the time stamp 602 is later than the time value 702, the output controller 600 retransmits its current output configuration 212 to the message sender 700. If, on the other hand, the time stamp 602 is not later than the time value 702, the output controller 600 ignores the request, because its current output configuration 212 has not changed since the message sender 700 lost communications with the output controllers 600.

Thus, the second embodiment of the present invention can correct outdated output configuration information before a message is sent using the outdated information. This advantageously reduces latency for messages that would have been sent with outdated configuration information and then resent after updating the configuration information. It will be appreciated that the first and second embodiments of the present invention can be combined to achieve advantages of both embodiments. By incorporating both the output configuration tag verification feature of the first embodiment and the time-qualified retransmission request feature of the second embodiment, a robust, low-latency system for minimizing and recovering from configuration errors is advantageously achieved.

By way of example, the present invention has been disclosed as applied to a radio communication system. It will be appreciated by one of ordinary skill in the art that the present invention can be applied to other types of communication systems, e.g., telephone systems and data communication networks, to name a few. Use of the present invention in such other types of communication systems does not depart from the scope and intent of the claims which follow.

What is claimed is:

1. A method for facilitating a recovery from a configuration error in a communication system comprising a message sender and an output controller having an output configuration, comprising the steps of:

transmitting, from the output controller, a notification comprising a current output configuration in response to the output configuration of the output controller being changed to the current output configuration, the notification intended for reception by the message sender;

storing a time stamp in a memory element of the output controller indicating a time at which the notification was transmitted;

sending from the message sender to the output controller, in response to a reestablishment of communications between the message sender and the output controller following a loss of communications, a request for a retransmission of the current output configuration of the output controller, the request qualified by a time value representing a time at which the loss of communications occurred; and retransmitting the current output configuration from the output controller to the message sender, in response to the request when the time stamp is later than the time value.

2. An output controller in a communication system having a message sender, the output controller for facilitating a recovery from a configuration error, the output controller comprising:

a communication interface coupled to the message sender for communicating with the message sender;

a processing system coupled to the communication interface for processing communications transmitted and received through the communication interface; and an output interface coupled to the processing system for cooperating therewith to maintain an output configuration of the output controller, wherein the processing system is programmed to:

transmit a notification comprising a current output configuration in response to the output configuration being changed to the current output configuration, the notification intended for reception by the message sender;

store a time stamp in a memory element of the output controller indicating a time at which the notification was transmitted;

receive from the message sender a request for a retransmission of the current output configuration of the output controller, the request qualified by a time value representing a time at which a loss of communications occurred; the request sent in response to a reestablishment of communications between the message sender and the output controller following the loss of communications; and retransmit the current output configuration from the output controller to the message sender, in response to the request when the time stamp is later than the time value.

3. A message sender in a communication system having an output controller, the message sender for facilitating a recovery from a configuration error, the message sender comprising:

a network interface for receiving a message from a message originator;

a processing system coupled to the network interface for processing the message; and a communication interface coupled to the processing system for communicating with the output controller, wherein the processing system is programmed to:

send to the output controller a request for a retransmission of a current output configuration of the output controller, the request qualified by a time value representing a time at which a loss of communications occurred, the request sent in response to a reestablishment of communications between the message sender and the output controller following the loss of communications; and receive the current output configuration from the output controller when a time stamp is later than the time value, the time stamp having been stored in a memory element of the output controller when a notification comprising an output configuration of the output controller was last sent to the message sender.

* * * * *